May 11, 1965

G. H. BACHELET ETAL 3,182,379

METHOD OF FORMING BEARING MOUNTINGS

Filed Jan. 28, 1963

Inventors
GILBERT H. BACHELET
AND DÉSIRÉ BRUIET
By Irvin S. Thompson
Attorney

Inventors
GILBERT H. BACHELET
AND DÉSIRÉ BRUIET
By Irvin S. Thompson
Attorney

United States Patent Office 3,182,379
Patented May 11, 1965

3,182,379
METHOD OF FORMING BEARING MOUNTINGS
Gilbert H. Bachelet and Désiré Bruiet, Orly, France, assignors to Air France, Paris, France
Filed Jan. 28, 1963, Ser. No. 254,504
Claims priority, application France, July 11, 1960, 832,578
4 Claims. (Cl. 29—148.4)

This application is a continuation-in-part of application Serial No. 111,672, filed May 22, 1961 and on which a patent has issued under No. 3,118,711.

This invention relates to a method of forming mountings for ball or roller bearings. As is known, such bearings must be kept rigidly centered or immobilized in through bores in their supports against any axial forces which may act on them. A method of mounting commonly used for this purpose consists in deforming the end portions of a cylindrical sleeve interposed between the bearing and the wall of the bore in the support, to form end flanges; the desired result, viz. complete immobilization of the bearing in its support is obtained, but at the cost of two drawbacks, namely:

(a) The compressive stresses created during the flanging of the sleeve ends tend to cause buckling, warping or like deformation of the sleeve, with consequent ovalisation, and throwing off-centre of the sleeve, and dissociation of the sleeve from the support and bearing; and (b) The continuous peripheral flanges of the sleeve ends render difficult the removal of the sleeve from the bore for replacement.

The object of the invention is to provide a method by which the bearing is quickly mounted in its support without the aforesaid undesirable deformation of the sleeve and by which a mounting is formed which facilitates removal of the bearing from the support for replacement without damage to the support.

The attached drawing shows an example of the application of the invention to a ball bearing of essentially known type.

Figure 1:
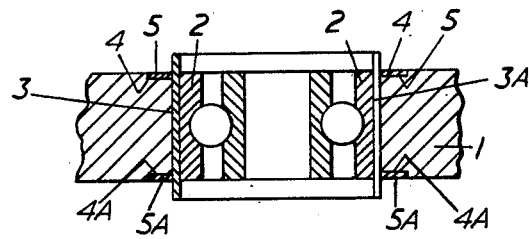
FIG. 1 is an axial section of the ball bearing and sleeve set in position in a support, before deformation of the sleeve ends.

Referring first to FIG. 1, it can be seen that the support 1 and the ball bearing 2 are of conventional type and not in themselves intended to be within the scope of the present invention, but only in association with the sleeve which will now be described.

Figure 2:
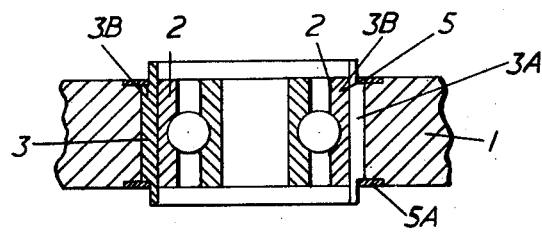
FIG. 2 is a similar section showing a variant form of sleeve.

The cylindrical sleeve 3 of light-gauge sheet metal is gapped by an axial slot 3A extending throughout its length, and surrounds the ball bearing 2 which it separates from the support 1. Its length is slightly greater than that of the bore of the support, in order to permit the cutting and bending of alternating lugs as subsequently described herein. FIG. 2 shows the application of the invention to a support of which the bore has had to be enlarged to compensate for damage suffered in removal of a bearing. The sleeve 3 is in this case provided with a shoulder or rebate 3B to compensate for this enlargement of the bore.

In each case, the support has at both ends of its bore an annular groove 4, 4A, forming a seating for a protective disc or washer 5, 5A, of thin metal, the purpose of which will be disclosed presently.

Figure 3:
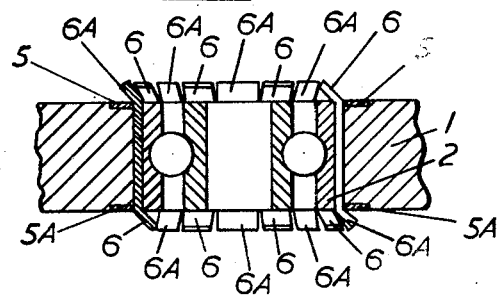
FIG. 3 is an axial section of the assembly according to FIG. 1, after a first deforming operation on the sleeve end portions.
Figure 4:
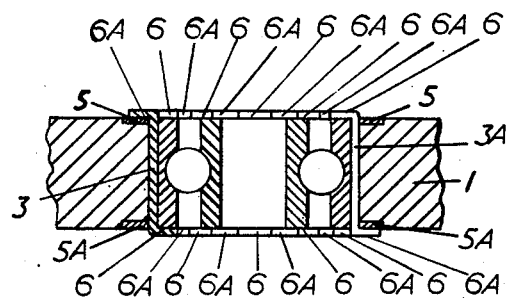
FIG. 4 is an axial section of the assembly after a second deforming operation on the sleeve ends.

FIG. 3 shows how each end portion of the sleeve 3, projecting beyond the surface of the washer 5 or 5A, is slit axially in such manner as to form a peripheral series of tongues. Alternate tongues of the series numbered 6, are bent back inwards over the adjacent face of the bearing itself, while the remainder numbered 6A, are bent back outwards, i.e. over the washers 5 and 5A respectively; FIGS. 3 and 4 show that these tongues 6 and 6A alternate and that, in a first operation, they are cut and partially bent (FIG. 3) and then, in a second operation, fully bent over on to an end face of the bearing and on to one of the two washers (FIG. 4) to form radial retaining tongues.

The bearing is thus firmly held in place, with no possibility of moving, particularly in the axial direction.

The combination of the axially gapped bearing sleeve with the axial slitting of the end portions of the sleeve to form peripheral series of tongues, effectively prevents the undesirable buckling, warping or like deformation of the sleeve, and enables quick and accurate mounting of the bearing in its support. Moreover, tongues are readily removable without damage to the support, to enable withdrawal of the bearing for replacement.

Figure 4A:
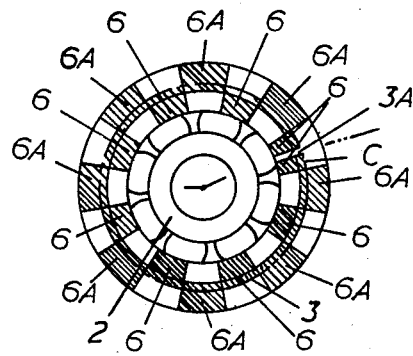
FIG. 4a is an end view in the direction of the arrow IVA in FIG. 4. (Like parts bear the same reference numerals in the various figures.)

The removal of the bearing is facilitated both by the thinness of the lugs, and by the fact that only half of the tongues of each series are bent outwards and that the tongues 6A bent outwards are pressed against one or the other of the washers 5 or 5A. This makes it possible by means of a light trepan or saw, to cut off the tongues 6A along the circumference C shown in dot-dash lines in FIG. 4a, and this is done on one side of the bearing only. In FIG. 4a, the area covered by the tongues 6 and 6A is shown hatched in the conventional manner, as is also the cross-section of the sleeve 3. Thus the flange holding the ball bearing is eliminated at least on one side, which is sufficient to enable the bearing to be forced out axially by applying pressure for instance in the direction of the arrow IVA if the tongues 6A bearing on the washer 5 have been cut off. The presence of this washer protects the support 1 against any damage by the cutting tool, and the forcing out of the bearing leaves the bore unharmed.

By way of example, the sleeve can be advantageously produced by deep drawing in a press or by extrusion, and the washers by stamping out in a press. The cutting and bending of the tongues can be performed with a hand punch using two identical upper and lower heads, and a centering pin adjustable to the bore of the bearing. In the case in which the bearing is of the cap or angle type, preventing the entry of the lower head, the tongues on one end of the sleeve are cut and bent remote from the bearing which is then fitted inside the prepared sleeve. With the washers in position on the support the sleeve-and-bearing assembly is inserted in the bore of the support, and the other end of the sleeve is operated on by means of a single punch.

We claim:

1. A method of mounting a ball or roller bearing in a through bore in a support, comprising inserting between the bearing and the bore wall a cylindrical sleeve gapped by an axial slot extending throughout the sleeve length, forming peripheral series of axial slits in end portions of the sleeve projecting from the bore, said slits defining peripheral series of tongues, one series at each end of the sleeve, and bending tongues of each series in opposite directions from one another to form outwardly and inwardly projecting radial tongues which extend over the support and bearing to retain the sleeve in the bore and retain the bearing in the sleeve.

2. The method according to claim 1, wherein each tongue of each series is bent oppositely to the next adjacent tongue of the series so that inner and outer peripheral series of spaced lugs extend over respectively the bearing and support.

3. The method according to claim 2, wherein axial slits are formed and the tongues partially bent in a first operation, and the tongues are fully bent to retaining position in a second operation.

4. The method according to claim 2, wherein washers are located in annular grooves in the support and series of tongues are bent to engage said washers.

References Cited by the Examiner

UNITED STATES PATENTS

| | | | |
|---|---|---|---|
| 1,903,776 | 4/33 | Clark et al. | 29—148.4 |
| 2,814,539 | 11/57 | Borger | 308—236 XR |
| 2,992,868 | 7/61 | Vacha | 308—236 |
| 3,118,711 | 1/64 | Bachelet et al. | 29—148.4 |

FOREIGN PATENTS 671,313   3/39   Germany.

WHITMORE A. WILTZ, *Primary Examiner.*

FRANK SUSKO, THOMAS H. EAGER, JOHN F. CAMPBELL, *Examiners.*